June 30, 1925.
A. OLGAY
1,544,101
ENVELOPE FASTENER AND PATCH APPLYING MACHINE
Filed March 5, 1923  3 Sheets-Sheet 1
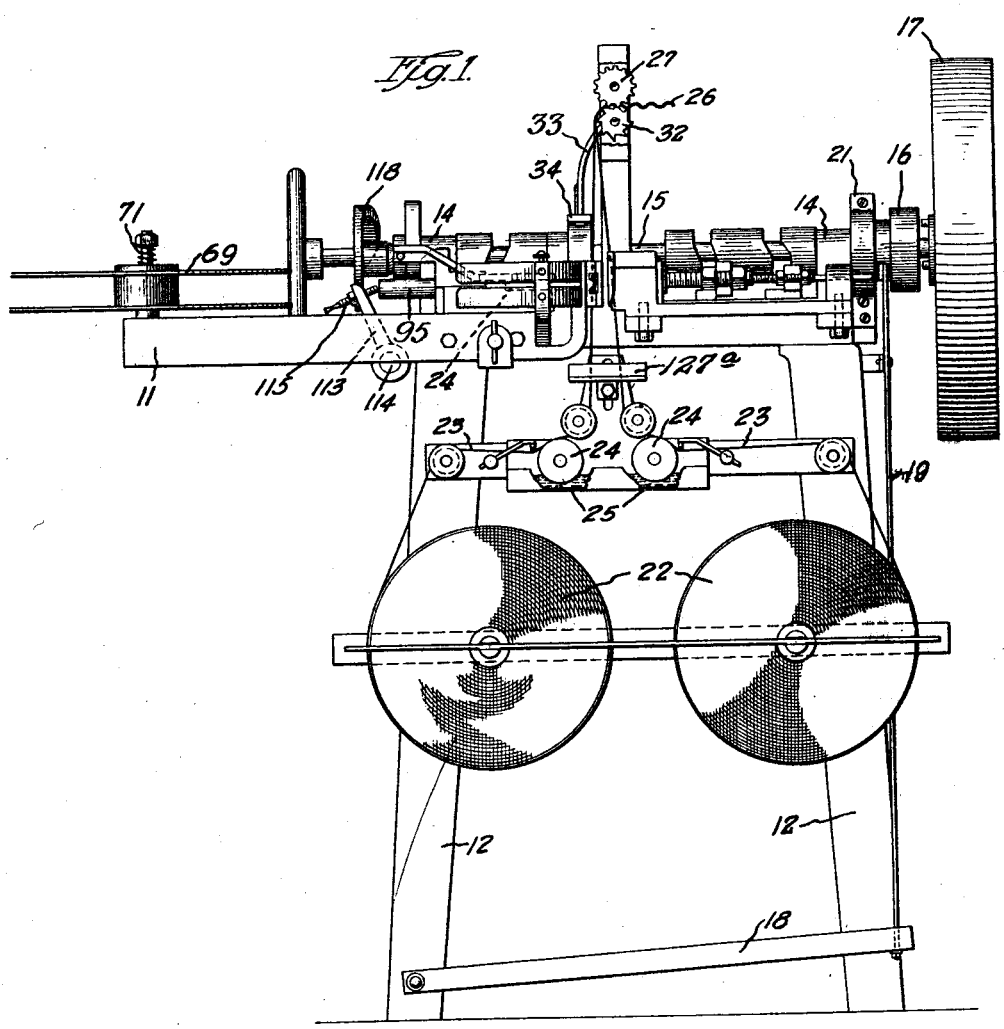
Albert Olgay.
Inventor.
Witness:-

June 30, 1925.  
A. OLGAY  
1,544,101  
ENVELOPE FASTENER AND PATCH APPLYING MACHINE  
Filed March 5, 1923  3 Sheets-Sheet 2
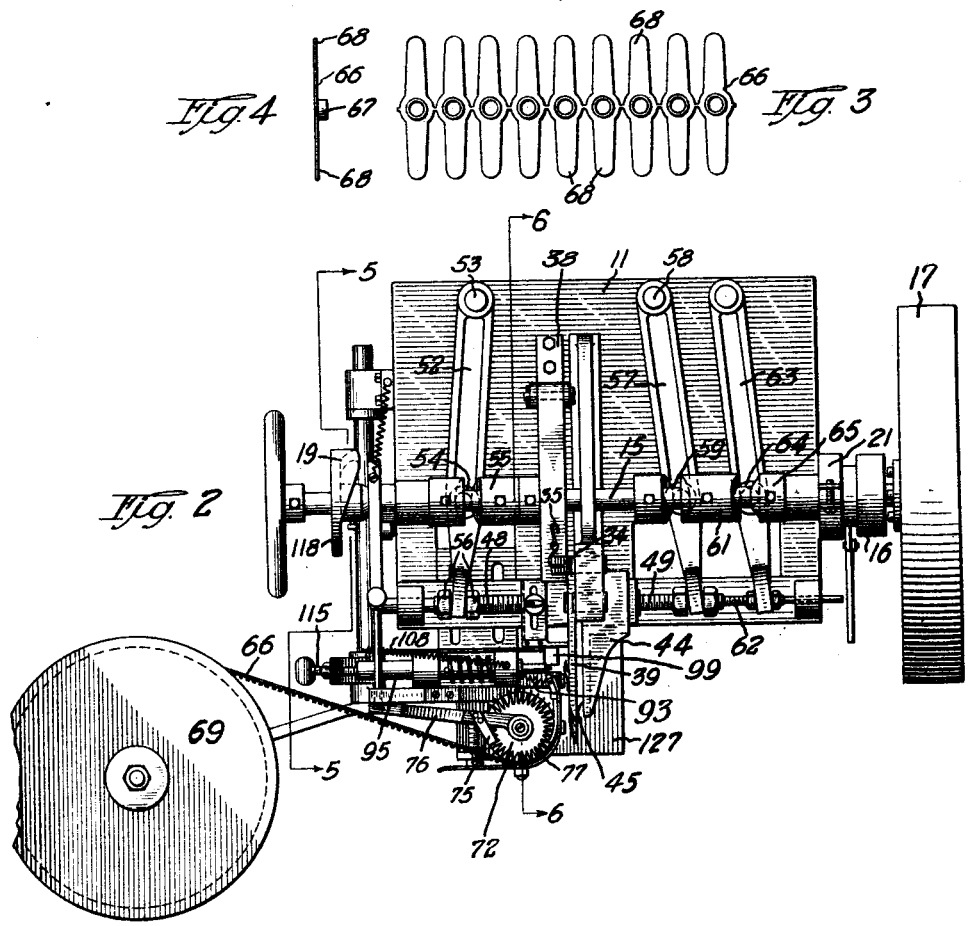
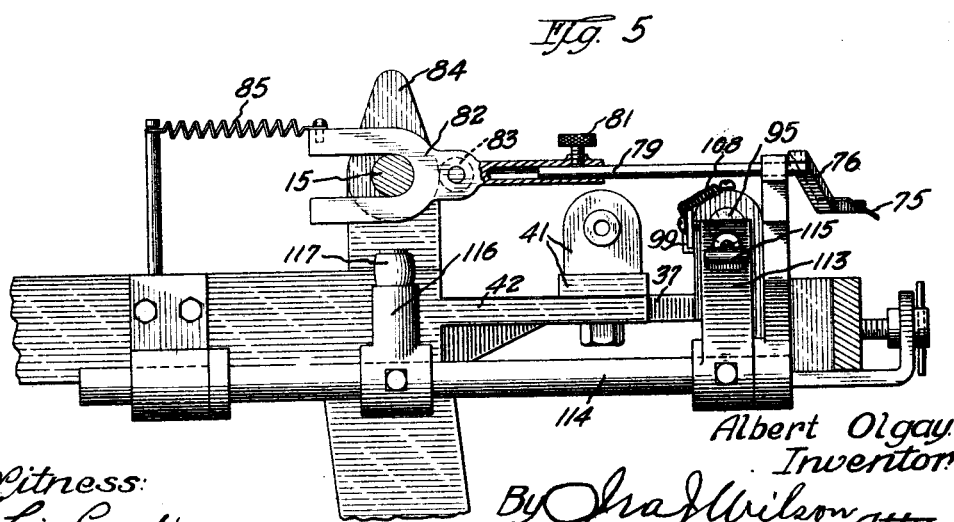
Witness:
Loie Condé.
Albert Olgay,
Inventor
By Ira J. Wilson Atty.

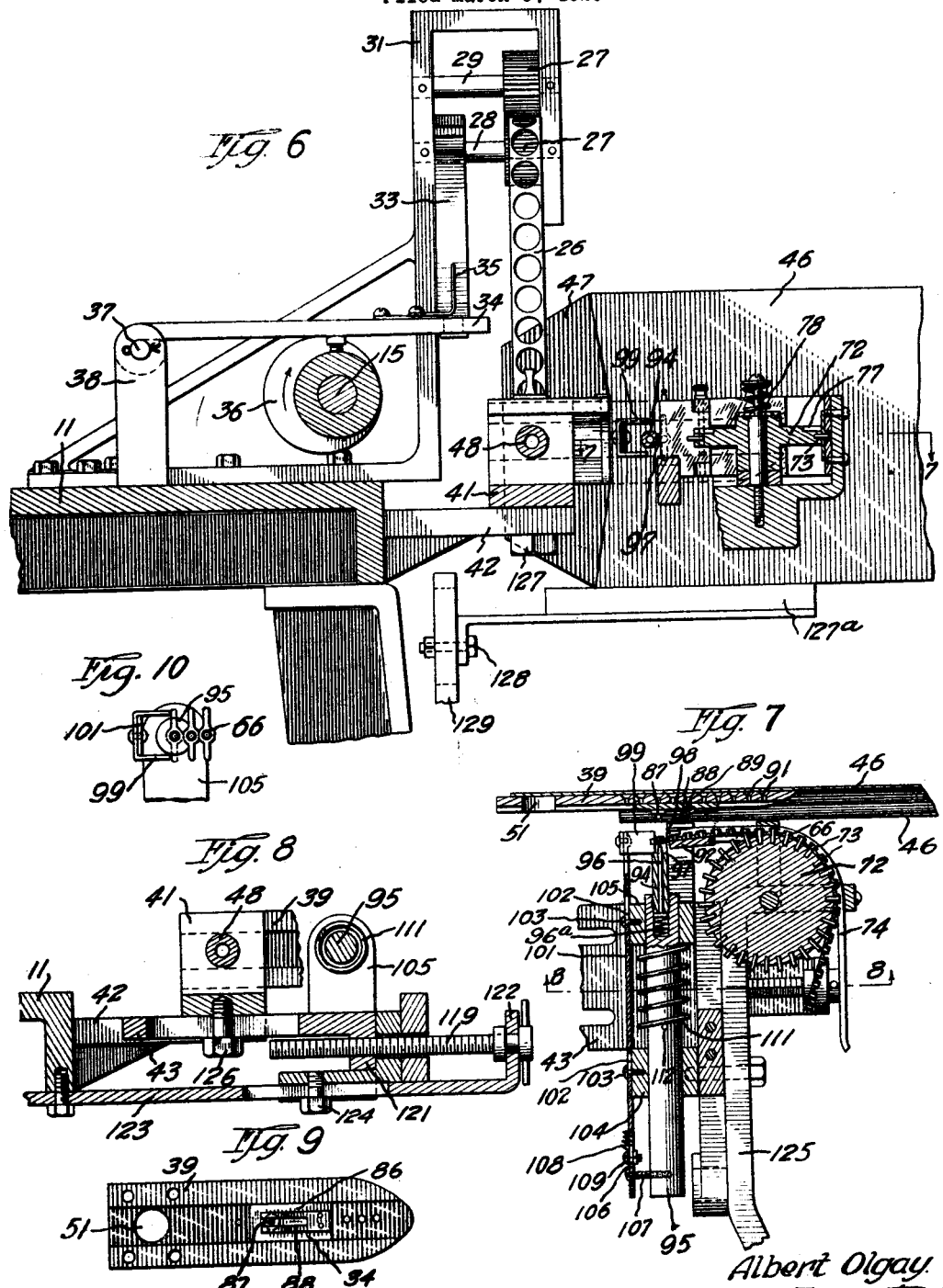

Patented June 30, 1925.

1,544,101

UNITED STATES PATENT OFFICE.

ALBERT OLGAY, OF GLEN ELLYN, ILLINOIS, ASSIGNOR TO GAW-O'HARA ENVELOPE CO., OF CHICAGO, ILLINOIS, A CORPORATION OF ILLINOIS.

ENVELOPE FASTENER AND PATCH-APPLYING MACHINE.

Application filed March 5, 1923. Serial No. 622,843.

*To all whom it may concern:*

Be it known that I, ALBERT OLGAY, a citizen of the United States, residing at Glen Ellyn, in the county of Du Page and State of Illinois, have invented certain new and useful Improvements in Envelope Fastener and Patch-Applying Machines, of which the following is a specification.

This invention relates to machines for applying metal envelope flap fasteners to envelope bodies, and perforated patches or washers to the envelope flaps to receive the fasteners by which the flaps are held in closed position.

I am aware that metal envelope fasteners which were attached to the envelope bodies by bent-over prongs or projections have prior to my invention been applied by machines to envelopes. The fasteners, however, which my present machine is designed to apply, comprise tubular central portions or bodies adapted to be riveted to the envelope, and provided with oppositely projecting wings or extensions which are capable of being bent into parallel relation for insertion through the reinforced opening in the envelope flap, and then straightened out again to hold the flap in closed position. These fasteners have heretofore been made individually and were fed to the applying machines, one at a time, by hand.

My present invention contemplates a machine which is capable of handling an integral strip of fasteners of this character, which instead of being made individually as heretofore, are formed in a continuous strip from an integral piece of metal.

One of the primary purposes of my present invention is to provide a machine which will feed such a strip of fasteners into position to be severed from the strip and applied to the envelopes by an applying mechanism which can be operated much more rapidly than the applying machines heretofore employed for applying the individual fasteners.

Another object of the invention is to provide a machine which will accurately handle, position and align the fasteners relatively to the applying mechanism so that the fasteners may be rapidly and accurately applied without liability of failure or inaccuracy in the operation of the machine.

Another purpose of the invention is to provide a machine which is capable of adjustment so that it may be quickly changed to operate upon envelopes of various sizes. The machine is therefore universal, and one machine may be used on a wide variety of sizes of envelopes.

Another feature of this invention resides in the fact that the machine may be operated with accuracy at very high speeds, thereby materially increasing the output and reducing the cost of the envelopes.

Other objects and advantages of this invention should be readily appreciated as the same becomes better understood by reference to the following description when considered in connection with the accompanying drawings.

Referring to the drawings:

Fig. 1 is a side elevation of a machine embodying my invention;

Fig. 2 is a plan view thereof;

Fig. 3 is a fragmentary plan view of a strip of fasteners which my machine is adapted to handle;

Fig. 4 is an edge view of the fasteners shown in Fig. 3;

Fig. 5 is a sectional view on the line 5—5 of Fig. 2;

Fig. 6 is a sectional view on the line 6—6 of Fig. 2;

Fig. 7 is a fragmentary sectional view on the line 7—7 of Fig. 6;

Fig. 8 is a sectional view on the line 8—8 of Fig. 7;

Fig. 9 is a face view of the anvil; and

Fig. 10 is a detail view of the fastener positioning and aligning device.

Referring now to the drawings more in detail, reference character 11 indicates generally the bed of the machine, which is supported upon suitable legs or standards 12. In suitable bearings 14 upon the bed there is journaled a main drive shaft 15 adapted to be driven through a one-revolution clutch 16 from a drive pulley 17. This clutch is controlled by a foot pedal 18 connected with the clutch by a rod 19, and in order to insure stoppage of the shaft when the clutch is thrown out, a drag brake 21 offers continuous resistance to the rotation of the shaft.

The gummed strips of paper from which the patches or reinforcing washers are formed, is fed through the machine from two rolls 22, rotatably mounted upon the machine frame. From these rolls the paper strips 23 travel over moistening rolls 24, partially submerged in a bath 25, from whence the strips travel upwardly in spaced relation between the punches, to be later described, and after the patches have been punched therefrom, the waste strips 26 are delivered by corrugated feed rolls 27, between which the strips are fed. These rolls, as will be apparent from Figs. 1 and 6, are mounted upon shafts 28 and 29, journaled in a bracket 31, and shaft 28 is provided with a ratchet wheel 32, upon actuation of which an intermittent feeding movement is imparted to the rolls. A pawl 33, mounted upon a lever 34 and urged into engagement with the ratchet wheel 32 by spring 35, is reciprocated to actuate the feed rolls by a cam 36, mounted upon the main shaft 15 immediately beneath the lever 34, which is fulcrumed at 37 between the ears 38. At each revolution of the shaft, the pawl 33 is actuated to impart a partial rotation to the feed rolls by which the paper strips are fed a predetermined distance at each actuation.

A stationary anvil 39 is mounted upon the end of a punch guiding block 41, adjustably supported upon slotted brackets 42 and a slotted guide plate 43, which in itself is adjustably mounted, as will be later explained. This anvil is spaced a limited distance from a guiding horn 44, leaving a slot 45, into which an envelope 46 may be inserted so that its flap 47 is disposed in alignment with and between the patch strips 23, from which the patches are punched and applied to the flap, as will be later explained. The anvil projects into the envelope, as will be evident from Figs. 6 and 7, so that one ply of the body portion is disposed between the anvil and the fastener applying punch, for the application of the fastener thereto.

One patch punch holder 48 is reciprocatorily mounted in the upstanding portions of the guide block 41, and the other punch holder 49 is similarly mounted in alignment with and opposed to the punch holder 48, both of these punch holders being disposed in alignment with the opening 51 in the anvil 39. Punch holder 48 is reciprocated by means of a lever 52 fulcrumed at 53 upon the machine frame, and provided with a cam follower 54 adapted to be actuated by a grooved cam 55 on the shaft 15. The free end of said lever engages the punch holder 48 between adjustable nuts 56, by which the stroke of the punch may be regulated. The punch holder 49 is similarly operated by a lever 57 fulcrumed at 58, and provided with a follower 59 adapted to be actuated from the cam 61. A smaller punch holder 62, slidable within the punch holder 49 and provided with a punch adapted to be projected through the applied patches and envelopes flap to produce a central perforation therein, is actuated from a lever 63 provided with a cam follower 64, engaged with the cam 65. The reciprocation of these various punches in timed relation punches a patch from each of the gummed strips 23 and applies the same to opposite faces of the envelope flap, whereupon the smaller punch is projected through the applied patches and flap, producing the central opening therein adapted to receive the wings of the metal fastener by which the envelope is held in closed position.

The metal fasteners are formed in a continuous strip, indicated by reference character 66, each fastener comprising a tubular body portion 67 and oppositely projecting wings or extensions 68. This strip of fasteners is wound upon a spool 69, rotatably mounted upon the machine frame, as will be apparent from Fig. 1, and frictionally held against rotation by an expansion spring 71. From this spool the strip is fed around a toothed feed wheel 72 provided with radially extending teeth 73 adapted to engage in the central apertures of the fasteners so that upon rotation of this wheel the strip is withdrawn and unwound from the spool. A guard plate 74, in proximity to the periphery of the wheel, maintains the strip in engagement with the wheel teeth. The feed wheel is intermittently actuated to feed the fastener strip in a step-by-step movement by means of a feed pawl 75, mounted upon a lever 76 fulcrumed upon the axis of the feed wheel, said pawl being engageable in ratchet teeth 77 formed upon the upper face of the feed wheel. A friction spring 78 retains the wheel against reverse movement. Lever 76 is oscillated to actuate the feed wheel by means of a longitudinally adjustable push rod 79 pivoted at its outer end to the lever 76 and adjustably connected by means of a set screw 81 with a forked member 82 straddling the main shaft 15, and equipped with a cam follower 83 adapted to be actuated by cam 84 on the shaft 15. A tension spring 85 holds the follower 83 in engagement with the cam.

The face of the anvil 39 is longitudinally grooved, as shown, to accommodate an anvil plate 86, which is equipped with a riveting die 87, and a stripper spring 88. The anvil plate is adjustably secured to the anvil by screws 89, and the anvil is provided with a series of counter-sunk apertures 91 adapted to receive these screws so that the anvil plate may be adjusted longitudinally of the anvil to properly position it for various sizes of envelopes.

The strip of fasteners, as it leaves the feed wheel, is guided by a pivotally mounted guide member 92, yieldingly held in position by spring 93 so that the endmost fastener of the strip is guided into alignment with the applying punch. This punch, as will be apparent from Fig. 7, comprises a riveting portion 94, fixed in and projecting beyond the end of a reciprocatory punch holder 95, and a pin 96 yieldingly projected beyond the end of the punch by an expansion spring 96ᵃ so that this pin will enter the aperture of the aligned fastener, and as the punch moves toward the anvil, the flat edge or corner 97 thereof will cooperate with a fixed shearing member 98 to shear the endmost fastener from the strip, which fastener, being impaled on the pin 96, will be carried toward the anvil, and forced through the envelope body and against the riveting die, by which the fastener will be securely riveted to the envelope.

In order to assist in aligning and properly positioning the endmost fastener with respect to the applying punch, a U-shaped aligning device 99 (Fig. 10) is carried upon a slide bar 101, which is slidably mounted by means of slots 102 and screws 103 upon the bearings 104 and 105, in which the punch holder 95 reciprocates. The rear end of this bar is provided with an elongated slot 106 through which projects a pin 107 extending laterally from the punch holder. A tension spring 108, attached at 109 to the bar and at its other end to the bearing 105, urges the bar toward the anvil as far as is permitted by the pin 107. The punch holder is normally held in retracted position by an expansion spring 111 surrounding the holder and interposed between the bearing 105 and a pin 112 carried by the punch holder. During the feeding movement of the fastener strip, the punch and the aligning member 99 are both held in the retracted position shown in Fig. 7, so that the endmost fastener will be fed into abutting relation with the aligning device 99, as shown in Fig. 10, and positioned in alignment with the punch to receive the pin 96 when the punch is moved toward the anvil.

The mechanism for forcing the punch toward the anvil is best shown in Figs. 2 and 5, from which it will be observed that an actuating arm 113 is adjustably mounted upon a rock shaft 114, and is equipped with an adjustable abutment screw 115 engaging the outer end of the punch holder 95. An arm 116 mounted on the shaft 114 is equipped with a follower 117 adapted to be actuated by a cam 118 fixed on the shaft 15, so that upon each oscillation of the shaft 114 in a clockwise direction, viewing Figs. 1 and 2, the punch will be projected toward the anvil to impale a fastener on the pin 96, sever the fastener from the strip, and apply it to the envelope.

The aligning devices 99, as will be apparent from Fig. 7, is normally spaced away from the envelope, and when the punch holder is retracted, as shown, is held in this position by the pin 107. When the punch moves toward the anvil, however, carrying with it the fastener, the aligning device will similarly move under the influence of the spring 108, thereby serving to maintain the severed fastener with its wings in proper vertical alignment until it is applied to the envelope. When the aligning device becomes engaged with the envelope so that further movement thereof is prevented, the pin 107 will then slide in the slot 106 during the remainder of the punch movement, and upon return movement of the punch, the aligning device will be withdrawn by engagement of the pin 107 with the end of the slot 106.

In order that the machine may be universally used upon envelopes of various sizes, the entire carrier upon which the feed wheel and the applying punch are carried, is adjustably mounted. Referring to Figs. 7 and 8, it will be apparent that the slotted guide and supporting plate 43 upon which the punch bearings 104 and 105 are mounted is adjustable through the instrumentality of an adjusting screw 119, threaded through a downturned flange 121 of this plate, and rotatably journaled in an upwardly extending flange 122 of a bar 123 fixed to the machine bed 11. By loosening the set screws 124, the plate 43 and also the feed wheel supporting member 125, which is fixed to this plate, may be adjusted bodily longitudinally of the anvil. By loosening the set screws 126 and 127, which secure the patch punch guilding member 44 to the plate 43 and to the bracket 42, respectively, this punch may be maintained in proper alignment during adjusting movements of the fastener applying punch, or its position may be adjusted if desirable. By adjusting the punches horizontally, the machine may be adapted to envelopes of various lengths, having flaps of various lengths. In order to bring the envelope at the proper height so that the fasteners and patches will be applied on a median line of the envelope, a supporting guide or plate 127ᵃ is adjustably mounted by a bolt and slot connection 128 upon a frame member 129 of the machine beneath the anvil. The envelope is permitted to rest upon this plate during the operation of the machine, and by adjusting the plate upwardly or downwardly the machine is accommodated to envelopes of various widths.

In the operation of my invention, the clutch 16 being normally disengaged, an envelope is slipped into position over the anvil 39, whereupon the foot treadle 18 is depressed to engage the clutch. The shaft 15 thereupon makes one revolution, and through the various cams and mechanisms described, feeds the patch applying tapes upwardly a predetermined distance, and feeds the fastener strip the width of one fastener into alignment with the applying punch, whereupon reciprocation of all of the punches causes a fastener to be applied to the body of the envelope, the washer patches to be applied to the flap, and a hole to be punched through the reinforcing flap. All of these operations are performed during one revolution of the shaft 15, whereupon the clutch 16 automatically throws out, the operator removes the envelope, places another one in position, and depresses the treadle 18, and the operation is repeated.

While I have shown and described a preferred embodiment of the invention, it should be manifest that the scope of the invention is not limited by the structural details illustrated, but various modifications therein may be resorted to without departing from the spirit of the invention, as defined in the following claims.

I claim:

1. In a machine of the character described, the combination of a stationary anvil adapted to receive an envelope, means for punching and applying patches to the envelope flap, a reciprocatory fastener applying punch, a feed wheel for feeding a strip of fasteners to said punch, means for imparting an intermittent movement to said wheel, and means for positioning the endmost fastener in alignment with said punch.

2. In a machine of the character described, the combination of an anvil, a wheel provided with radial projections adapted to engage in the apertures of a strip of apertured fasteners for advancing said strip, means for intermittently actuating said wheel, means for aligning the endmost fastener of said strip, means for severing said fastener from the strip and applying the same to the envelope, and means for simultaneously forming and applying patches to the envelope flap.

3. In a machine of the character described, the combination of a stationary anvil, a vertically adjustable envelope support beneath said anvil, means for feeding a strip of apertured fasteners, a fastener applying punch, means for feeding a plurality of strips of envelope patch tape, a pair of patch applying punches, means for actuating all of said punches in timed relation, and means whereby said punches may be relatively adjusted to accommodate the machine to envlopes of various sizes.

4. In a machine of the character described, the combination of an anvil, means for supporting an envelope in operative relation to said anvil, a patch applying punch and a fastener applying punch cooperating with said anvil, means for adjusting said punches toward and from each other, means for feeding a strip of patch material between the patch applying punch and an envelope flap, and means for feeding a strip of perforated metal fasteners between the fastener applying punch and the envelope.

ALBERT OLGAY.